Figure 1:
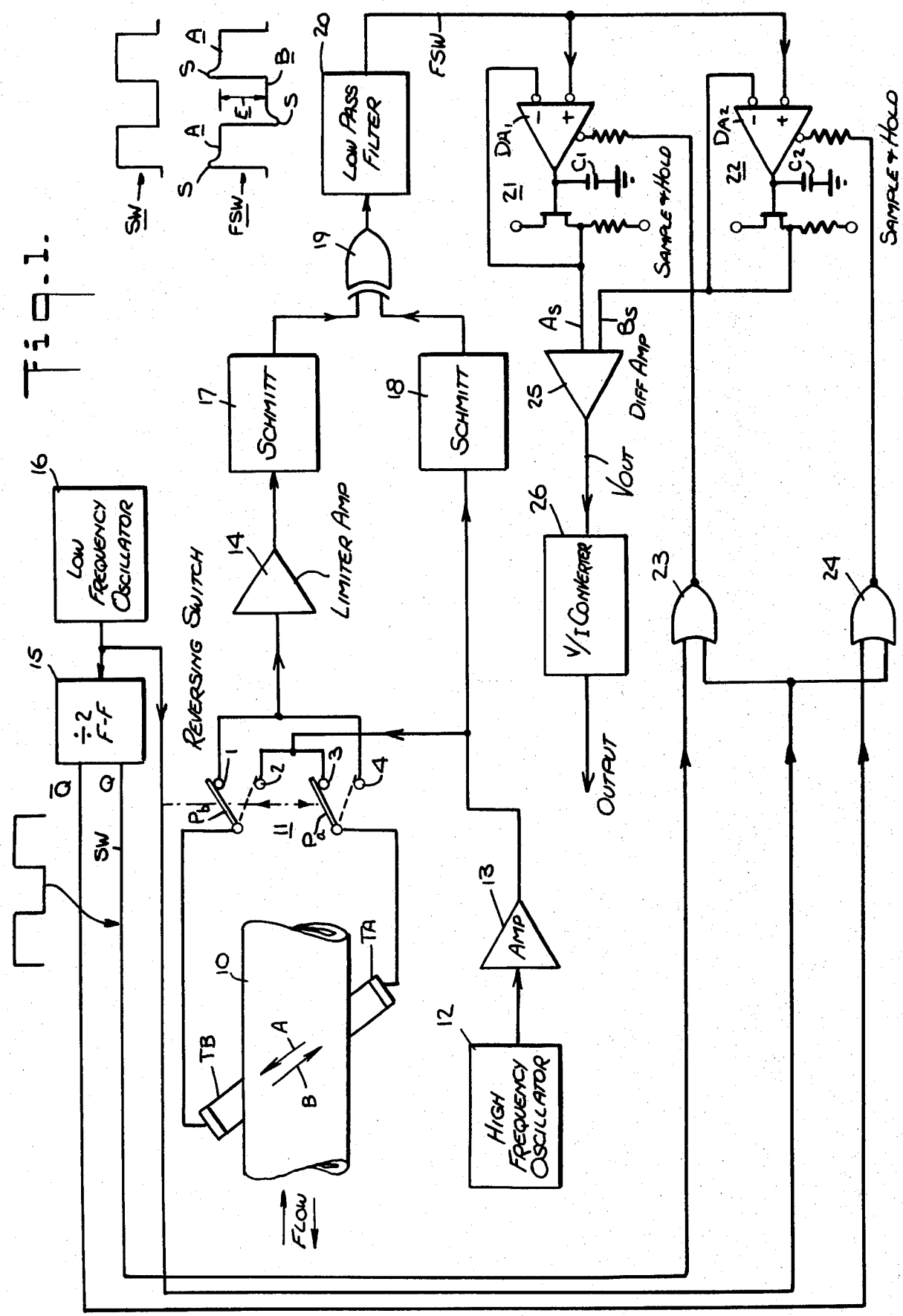

United States Patent [19]

Herzl et al.

[11] Patent Number: 4,468,971
[45] Date of Patent: Sep. 4, 1984

[54] ULTRASONIC FLOWMETER FOR CLEAN AND DIRTY FLUIDS

[75] Inventors: Peter J. Herzl, Morrisville; Robert J. Augustine, Horsham, both of Pa.

[73] Assignee: Fischer and Porter Company, Warminster, Pa.

[21] Appl. No.: 398,808

[22] Filed: Jul. 16, 1982

[51] Int. Cl.³ .............................................. G01F 1/66
[52] U.S. Cl. ................................................. 73/861.28
[58] Field of Search ........................ 73/861.27, 861.28

[56] References Cited

U.S. PATENT DOCUMENTS

| | | | |
|---|---|---|---|
| 2,724,269 | 11/1955 | Kalmus | 73/861.28 |
| 3,762,217 | 10/1973 | Hagen | 73/862.34 X |
| 4,164,865 | 8/1979 | Hall et al. | 73/861.28 |
| 4,210,022 | 7/1980 | Boss | 73/861.17 |
| 4,227,407 | 10/1980 | Drost | 73/861.28 |
| 4,321,835 | 3/1982 | Martin | 73/861.28 |

Primary Examiner—Charles A. Ruehl
Attorney, Agent, or Firm—Michael Ebert

[57] ABSTRACT

An ultrasonic flowmeter for accurately measuring the flow rate of clean or dirty industrial process fluids passing through a pipe provided with upstream and downstream transducers. A transmission signal produced by a high-frequency generator acts to energize the transducers which are alternately excited at a relatively low switching rate whereby a beam emitted by the excited transducer is propagated through the fluid at an angle to the flow axis of the pipe and is intercepted by the other transducer to yield a received signal that is displaced in phase from the transmission signal to an extent depending on the transit time of the beam which reverses direction during each switching cycle. The received signals from the transducers are converted into a square wave that is compared to a wave derived from the transmission signal to produce a comparison output which is fed through a low-pass filter to exclude the high frequency content thereof. The filter yields a square wave in which the voltage drop between the upper level of the wave representing beam transit time in one direction and the lower level representing beam transit time in the reverse direction, reflects the time delay difference between these transit times. The flow rate of the fluid is then derived from the time delay difference.

7 Claims, 3 Drawing Figures

ULTRASONIC FLOWMETER FOR CLEAN AND DIRTY FLUIDS

BACKGROUND OF INVENTION

This invention relates generally to ultrasonic flowmeters for measuring the flow rate of fluids passing through a flow pipe, and more particularly to a meter of this type capable of accurately and reliably measuring the flow rate of industrial process fluids which range in quality from clear to moderately dirty.

In general, ultrasonic flowmeters are either of the through-beam or of the Doppler-type. In a through-beam meter, the meter pipe has upstream and downstream transducers mounted thereon which are alternately excited at a relatively rapid rate to generate an ultrasonic pulse which is propagated through the fluid being metered and received by the other transducer. The upstream propagation time minus the downstream propagation time represents the time delay difference between the generation of the emitted pulses and their reception. This difference is a function of the flow velocity of the fluid and is convertible into a flow rate reading. Among the patents which disclose through-beam ultrasonic flowmeters are U.S. Pat. Nos. 4,103,550, 4,004,461, 3,906,791 and 4,195,517.

The through-beam ultrasonic flowmeter is acceptably accurate only when the liquid being metered is substantially free of contaminants; for the presence of particulate matter in the propagation path causes this meter to malfunction. In contradistinction, contaminants in the fluid are essential to the operation of a Doppler-type meter.

The Doppler effect is encountered whenever a wave source generating sonic, radio-frequency, light or any other form of wave activity and a wave receiver are in relative motion with respect to one another. When the distance between the source and its receiver is decreasing, extra waves are detected in a given time, resulting in an apparent increase in the received frequency. When, however, the distance is increasing, an apparent decrease is experienced in the frequency of the received signal.

In a Doppler-type ultrasonic flowmeter, a continuously transmitted signal is mixed with the received signal to produce a beat signal which represents the difference therebetween, the frequency of the beat signal being proportional to the velocity of the reflecting contaminants and hence to the flow rate of the fluid through the flow pipe.

Because in a Doppler-type ultrasonic flowmeter the transmitting and receiving transducers are mounted on the exterior of the meter pipe, the instrument is obstructionless and is free of erosion and corrosion problems. The normal fields of application for a Doppler-type flowmeter are pipes conducting contaminated media where through-beam flowmeters do not work or perform poorly. Thus Doppler-type ultrasonic flowmeters are useful in metering raw sewage or sludge in water treatment plants as well as in metering wash or wastewater, slurries and effluents in chemical, paper processing and mining systems. As noted in the article by Morris in the August 1979 issue of *Control Engineering*, entitled "What's Available in Ultrasonic Flowmeters," the accuracy of Doppler-type flowmeters is normally less than that quoted for through-beam meters.

Some industrial process fluids are neither sufficiently clean to permit flow measurement with through-beam ultrasonic meters, nor adequately contaminated with reflective particles to allow for measurement with Doppler-type meters. Hence with existing types of ultrasonic flowmeters, it is difficult to obtain reliable readings with fluids which vary from a relatively clean state to a moderately dirty condition, for no one form of available meter is capable of responding effectively to both states. Moreover, the response time of existing meters is relatively sluggish.

SUMMARY OF INVENTION

In view of the foregoing, the main object of this invention is to provide an ultrasonic flowmeter capable of accurately measuring the flow rate of a fluid regardless of whether the fluid is clean or dirty.

More particularly, an object of this invention is to provide an ultrasonic flowmeter of the above type in which upstream and downstream transducers energized by a high-frequency generator are alternately excited at a relatively low switching rate to produce a beam of continuous energy which is projected through the fluid at an angle to the flow axis of the pipe, the beam reversing direction during each switching cycle.

Also an object of the invention is to provide an ultrasonic flowmeter capable of measuring flow rate regardless of the direction of fluid flow through the pipe, the meter also indicating the flow direction.

Briefly stated, these objects are attained in an ultrasonic flowmeter for accurately measuring the flow rate of clean or dirty industrial process fluids passing through a pipe provided with upstream and downstream transducers. A transmission signal produced by a high-frequency generator acts to energize the transducers which are alternately excited at a relatively low switching rate whereby a beam emitted by the excited transducer is propagated through the fluid at an angle to the flow axis of the pipe and is intercepted by the other transducer to yield a received signal that is displaced in phase from the transmission signal to an extent depending on the transit time of the beam which reverses direction during each switching cycle.

The received signals derived from the transducers are converted by a Schmitt trigger into a square wave that is compared to a wave derived from the transmission signal to produce a comparison output which is fed through a low-pass filter to exclude the high frequency content thereof. The filter yields a square wave in which the voltage drop between the upper level of the wave representing beam transit time in one direction and the lower level representing beam transit time in the reverse direction, reflects the time delay difference between these transit times. The flow rate of the fluid is then derived from the time delay difference.

OUTLINE OF DRAWINGS

Figure 2:
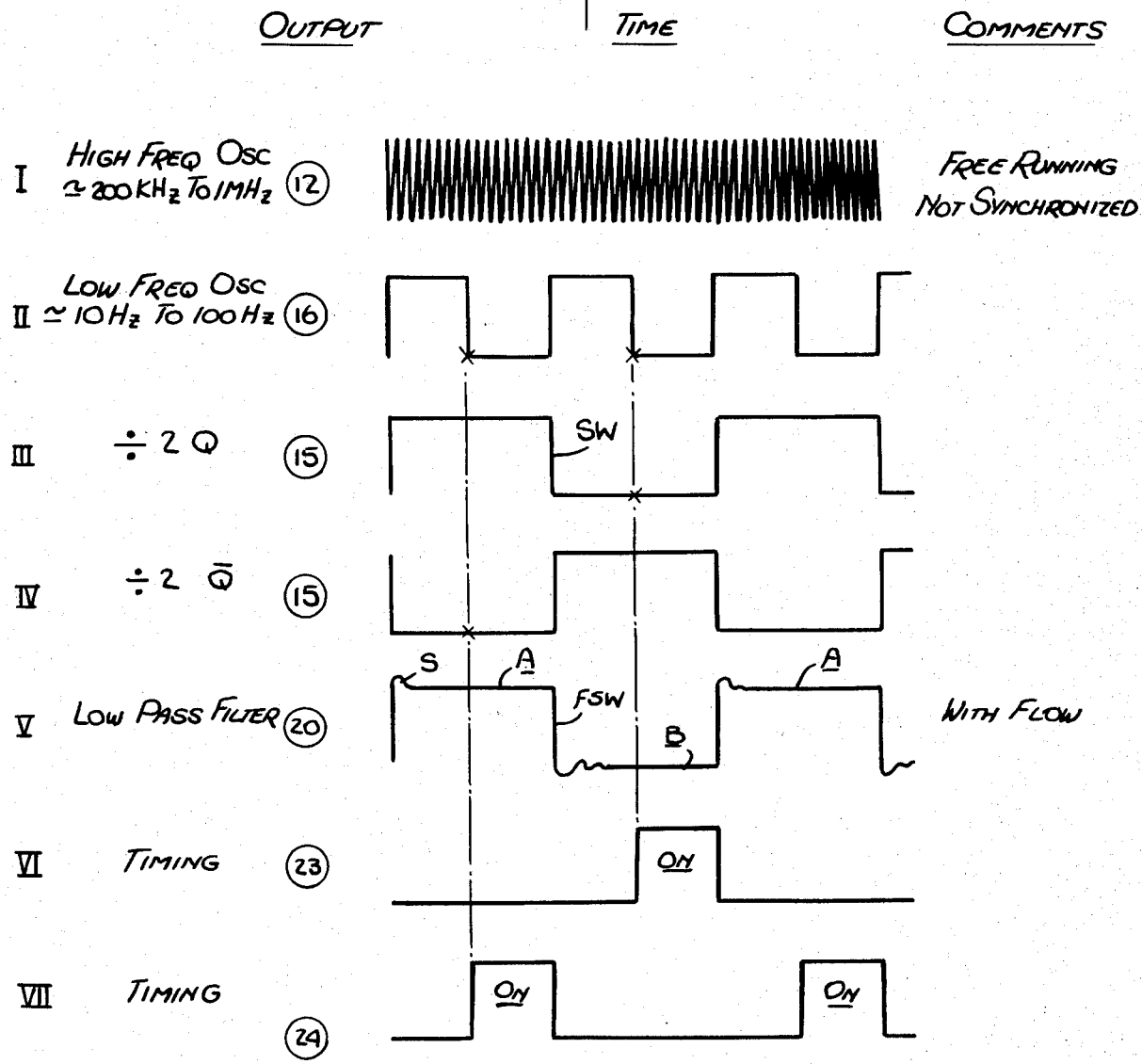
Figure 3:
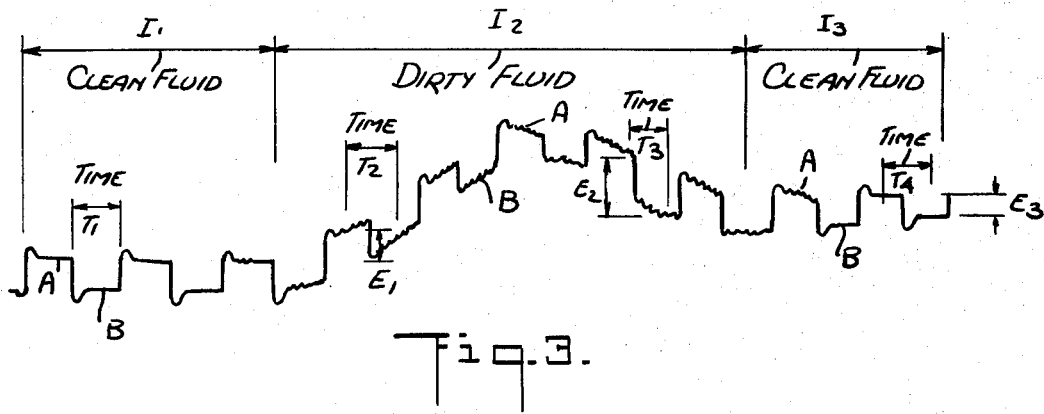

For a better understanding of the invention as well as other objects and further features thereof, reference is made to the following detailed description to be read in conjunction with the accompanying drawings, wherein:

FIG. 1 schematically illustrates in block diagram form an ultrasonic flowmeter in accordance with the invention;

FIG. 2, on lines I to VII, is a timing diagram illustrative of the functions of the electronic secondary of the flowmeter; and FIG. 3 represents the output of the low-pass filter included in the secondary under varying fluid conditions.

DESCRIPTION OF INVENTION

Basic System:

Referring now to FIG. 1, there is illustrated an ultrasonic flowmeter in accordance with the invention in which the fluid to be metered is conducted in either direction, as indicated by the flow arrows, through the flow pipe 10 of the flowmeter primary. The industrial process fluid to be metered may vary in condition from perfectly clean to moderately dirty without substantially degrading the accuracy of the flow rate reading. The meter also indicates the direction of flow.

Mounted on opposite sides of the flowmeter pipe 10 at upstream and downstream positions thereon are transducers TA and TB. Transducer TA is downstream of transducer TB when the flow direction is toward the right, the relationship being reversed when flow is toward the left. The operation of the flowmeter is such that when transducer TA is excited by a transmission signal, a beam of continuous ultrasonic energy is propagated through the fluid at an angle to the longitudinal flow axis of the pipe toward transducer TB in beam direction A. The signal then received by transducer TB is displaced in phase from the transmission signal to an extent depending on the transit time of the beam. And when transducer TB is excited, the resultant beam is projected at the same angle toward transducer TA in the reverse beam direction B, the resultant received signal having a phase relative to the transmission signal which depends on the transit time of the beam in direction B.

Transducers TA and TB are alternately excited at a low switching rate through a double-throw, double-pole reversing switch 11. The transducers are excited by a high-frequency transmission signal produced by a generator 12 whose output is applied through an amplifier 13 to the fixed contacts 2 and 3 of switch 11 whose movable pole $P_a$ is connected to transducer TA and whose movable pole $P_b$ is connected to transducer TB. Fixed contacts 1 and 4 of switch 11 are both connected to the input of a limiting-amplifier 14.

The switching circuit is such that in the state shown in FIG. 1 in which pole $P_a$ engages contact 3 and pole $P_b$ engages contact 1, transducer TA is then excited to propagate a beam in direction A which is received by transducer TB whose output signal is applied through pole $P_b$ and contact 1 to amplifier 14. When the switching status is reversed and pole $P_a$ engages contact 4 and pole $P_b$ engages contact 2, then transducer TB is excited to produce a beam in direction B which is received by transducer TA whose output signal is then applied to amplifier 14. The limiting amplifier input alternates between the received signals from the transducer TA and TB.

High-frequency generator 12 is operable at a selected frequency in a range of between about 100 kHz and 1 mHz, the frequency selected depending on the nature of the fluid being metered and the size of the meter. It is known that with a very dirty fluid, a low-frequency ultrasonic beam has a greater penetrating power than a high frequency beam. Hence when the expectation is that the fluid will be dirty, a relatively low frequency is selected for operation; for while high-frequency operation affords better resolution, it does not penetrate the dirty fluid as well.

And when the meter has a large diameter and it becomes necessary to penetrate a large amount of fluid, whether or not dirty, low-frequency operation with its attendant greater penetrating power, is then preferred. But with a meter of small diameter in which relatively little fluid is to be penetrated, one can then exploit the improved resolution gained with high-frequency operation. Hence, in practice, generator 12 takes the form of a stable free-running oscillator whose frequency is adjustable within the useful ultrasonic range.

Reversing switch 11 is electromagnetically actuated under the control of a flip-flop 15 coupled to a low-frequency oscillator 16 whose output frequency lies between 10 and 100 Hz. The output of flip-flop 15 at its Q terminal is a square wave SW, as illustrated in FIG. 1, whose frequency is one half that of oscillator 16. Thus if the oscillator frequency is 10 Hz, the square wave frequency is 5 Hz. This means that for 1/10 of a second, transducer TB is excited. Thus the beam in direction A is "on" for 1/10 of a second in each cycle and then the beam in direction B is "on" for the same period.

Amplifier 14 which alternately receives the signals from transducers TA and TB is basically a high gain, overdriven amplifier, that includes a diode or other limiter. Because amplifier 14 is overdriven and its output is limited, the amplifier compensates for the attenuation of the source beam by various fluids, as well as for attenuations that vary in accordance with the solids or dirt content in these fluids. This action is comparable to the traditional function of a limiting amplifier in an FM system in which the limiter acts to delete the amplitude modulation component in the FM signal while retaining its phase content.

The output of amplifier 14 is changed to a full square wave by Schmitt trigger 17. The transmission signal output of amplifier 13 coupled to high-frequency generator 12 is applied to a Schmitt trigger 18 to also produce a full square wave. Since the amplifier 14 output signal is at the frequency of the received ultrasonic beam and the output of amplifier 13 is at the frequency of the transmitted ultrasonic beam, the frequencies are the same, the phases are displaced to an extent depending on flow rate. This phase relationship is expressed in the outputs of Schmitt triggers 17 and 18.

The phase relationship of the square wave output from Schmitt trigger 17 as compared with that from Schmitt trigger 18 in a phase detector 19, preferably in the form of an "Exclusive Or" device. The output of phase detector 19 goes through a low-pass filter 20 which removes the high frequency content present in the output to provide a filter output whose dc level represents the phase relationship.

It is important that one understand why the phase displacement between the square wave outputs of Schmitt triggers 17 and 18 represent a significant time delay which is incurred by the high-frequency sonic beam as it traverses the fluid in the pipe, plus some additional delays taking place in the electronic system.

When switch 11 is set to produce an ultrasonic beam which travels from transducer TA to transducer TB in direction A, the output of phase detector 19 derived through low-pass filter 20 produces, as shown in the waveform in FIG. 1, a d-c output level A; and when the switch reverses the beam direction to direction B, the output of the filter is then at level B. The drop in voltage E between levels A and B represent the difference in time delay of the beam passing through the pipe in the A and B directions.

Because of the voltage drop between the levels of A and B, the output of low-pass filter 20 is a square wave FSW whose frequency corresponds to the low switching rate of reversing switch 11. The amplitude of this square wave is related to the difference in time delay as the ultrasonic beam passes in either direction (A and B) through the fluid; this difference reflecting the flow rate of the fluid.

If, in the square wave output FSW of filter 20, the A level component is more positive than the B level component, this is indicative of flow in one direction; and if the B level component is more positive than the A level, then flow is in the reverse direction. Therefore, in order to determine flow direction, the phase of square wave FSW from the filter is compared with the phase of low-frequency oscillator square wave SW driving reversing switch 11. If FSW is in phase with SW, flow is in one direction; and if out of phase, flow is in the reverse direction.

With each switching action of reversing switch 11, there is an initial transitory surge. Such surges are represented in waveform FSW by the leading edge surges S. A certain amount of time is required for the condition of transducers TA and TB following an abrupt switching action to become stabilized. Because the output of phase detector 19 in response to the surges has no useful meaning, it must be disregarded by the system.

In order to produce and maintain voltages equal to the A and B levels of the waveform FSW and to ignore the unstable initial surges S, a pair of sample and hold circuits 21 and 22 is provided. Each circuit includes a differential amplifier ($DA_1$ and $DA_2$) to whose non-inverting (+) input is applied the square wave FSW from filter 20. The output of each amplifier is held by a capacitor ($C_1$ and $C_2$).

To discriminate against the surge S preceding the stable portion of level A in the waveform FSW, the operation of sample and hold circuit 21 is initiated during the stable portion of level A. Similarly, the operation of sample and hold circuit 22 is initiated during the stable portion of level B. In addition, it is desirable for the outputs of the sample and hold circuits to represent an average level during the A and B periods, this being accomplished by giving these circuits a very long acquisition time. Capacitors $C_1$ and $C_2$ internal to the sample and hold circuits act as integrating capacitors which do not fully get to the input voltage during the sample periods.

The required timing for the sampling periods is provided by gates 23 and 24 which activate the respective sample and hold circuits 21 and 22 which thereafter operates during the stable portions of waveform FSW, as previously explained. Gate 23 is responsive to the square wave output from low frequency oscillator 16 and the square wave SW yielded by the Q terminal of flip-flop 15, while gate 24 is responsive to the square wave output from low frequency oscillator 16 and the the square wave SW yielded by the $\bar{Q}$ terminal, the latter wave being in phase opposition to the Q terminal wave. Thus the sample and hold circuits are activated alternately in synchronism with the reversing switching action.

The output of sample and hold circuit 21 is a voltage $A_s$ representing the stable A portion of square wave FSW, while the output of circuit 22 is a voltage $B_s$ representing the stable B portion of this square wave. Voltages $A_s$ and $B_s$ are applied to a differential amplifier 25 which amplifies the difference between these voltages to produce an output voltage $V_{out}$. Output voltage $V_{out}$ is proportional to the flow rate and has a polarity indicative of flow direction. Thus a positive output voltage indicates flow in one direction and a negative flow in the reverse direction.

A module 26 responsive to the output voltage $V_{out}$ from differential amplifier 25 functions as a voltage-to-current converter which changes this voltage to current lying in the standard 4 to 20 mA range for use in industrial process control applications. The converter also generates a plus or minus polarity sign indicative of the direction of flow in pipe 10.

Timing:

Referring now to FIG. 2, there is shown a timing diagram illustrative of the functions of the electronic secondary of the flowmeter. On line I, there is shown the transmission signal from generator 12 which energizes the transducers. This signal is free running. It has a much higher frequency than the other frequencies involved in the secondary and is in no way synchronized therewith.

It is important to appreciate that during the A&B period when the levels yielded by phase detector 19 and low-pass filter 20 are detected, literally thousands of cycles of ultrasonic energy are being evaluated, this resulting in a very high information rate. This is especially important with dirty fluids when considerable jitter is developed between individual bits of information and averaging of many bits is required. This is one of the system's major advantages over time-of-flight systems using the leading edge of a pulse to determine flight time. Since there are relatively few of these pulses, relatively long time periods are required to produce good averages in the presence of noise.

On line II, there is shown in relationship to the transmission signal on line I, the square wave output of low-frequency oscillator 16. This activates flip-flop 15 whose square wave output at terminal Q for driving the reversing switch 11, as shown in line III, is one half the frequency of oscillator 16. Line IV shows the square wave output at terminal $\bar{Q}$, this being in opposition to the Q output. These Q and $\bar{Q}$ outputs, together with the square wave output from low-frequency oscillator 16 produce the timing shown on lines VI and VII for gates 23 and 24.

It will be seen in line VI that the output of gate 23 goes high only when the voltage from oscillator 16 (line II) goes low and voltage Q (line III) is then also low. It will be seen in line VII that the output of gate 24 goes high only when the voltage from oscillator 16 and $\bar{Q}$ are low. Thus lines VI and VII show the "on" time of the gates.

Line V shows the output of low-pass filter 20, where it will be seen that there is an initial surge S at the respective signal levels A and B which constitute the unstable portions of these levels. The second halves of levels A and B are stable, and it is only at these voltage levels that gates 23 and 24 activate the sample and hold circuits 21 and 22 to sense and hold, thereby disregarding the unstable portions. Thus the flow information is continually examining during the "on" times of gates 23 and 24.

Filter Output:

Referring now to FIG. 3, there is shown the output of low-pass filter 20 as it might look when the fluid passing through the meter is first clean for a given interval $I_1$, then dirty for a longer interval $I_2$, and again clean during a succeeding interval $I_3$.

In interval $I_1$, in which the fluid is clean, we start with a clearly defined fluid wave shape in which the A and B voltage lines are fully recognizable during a time period $T_1$. Next we come to the dirty fluid period $I_2$ in which a great deal of modulation exists and the signals have become noisy. When observing the voltage drop between levels A and B at time $T_2$ and after at time $T_3$, we see that the drop between these levels at time $T_2$ is voltage $E_1$ and at time $T_3$ is voltage $E_2$, and that these voltages are drastically different. But in interval $I_3$ we again return to a clean fluid state, and in time $T_4$ the voltage drop $E_3$ between the A and B levels is well defined. Due to the integrating capability of the sample and hold circuits by capacitors $C_1$ and $C_2$, the output of the secondary will be the average value of $E_1$, $E_2$ and $E_3$. In the absence of this averaging capability, the output during a dirty fluid interval would have no real meaning. Thus the meter can have excellent response time to fluid flow on clean fluids and reasonably good response time to fluid flow with dirty fluids.

While there has been shown and described a preferred embodiment of an ultrasonic flowmeter for clean and dirty fluids in accordance with the invention, it will be appreciated that many changes and modifications may be made therein without, however, departing from the essential spirit thereof.

We claim:

1. An ultrasonic flowmeter for measuring the flow rate of clean or dirty fluids, said flowmeter comprising:
   A. a pipe through which the fluid to be metered is conducted, said pipe being provided with upstream and downstream transducers;
   B. means including a reversing switch to alternately excite said transducers with a high-frequency transmission signal at a relatively low periodic switching rate whereby a beam emitted by the excited transducer is propagated through the fluid at angle to the flow axis of the pipe and is received by the other transducer to yield a received signal that is displaced in phase from the transmission signal to an extent depending on the transmit time of the beam through the fluid, the beam reversing direction during each operating cycle of the switch;
   C. means coupled to the transducers to convert the received signals yielded thereby into a square wave;
   D. means to compare the square wave with a reference wave derived from the transmission signal to produce a comparison wave;
   E. means to pass the comparison wave through a low-pass filter to exclude the high-frequency content thereof, the filter yielding a square wave in which the voltage drop between the upper level of the wave during a stable portion following an initial switching surge representing the transit time in one direction, and the lower level of the wave during a stable portion following an initial switching surge representing the transit time in the reverse direction reflects the time delay difference between these transit times; and
   F. means to derive a flow rate reading from said time delay difference; said means including a pair of sample and hold circuits which are alternately activated, whereby one circuit holds the voltage representing the high level of the filter square wave and the other the low level of the filter square wave, said circuits being operative only during the stable portions of said voltage levels.

2. A flowmeter as set forth in claim 1 wherein said transmission signal is produced by a free-running generator.

3. A flowmeter as set forth in claim 1, wherein said reversing switch is actuated at said low rate by a flip-flop responsive to a low-frequency oscillator.

4. A flowmeter as set forth in claim 1, wherein said means coupled to said transducers to convert the received signals into a square wave includes a first Schmitt trigger.

5. A flowmeter as set forth in claim 4 further including a limiting amplifier in advance of said first Schmitt trigger.

6. A flowmeter as set forth in claim 5, wherein said reference wave is produced by a second Schmitt trigger.

7. A flowmeter as set forth in claim 1, wherein the outputs of the sample and hold circuits are applied to a differential amplifier to determine the voltage drop between the high and low levels.

* * * * *

UNITED STATES PATENT OFFICE
CERTIFICATE OF CORRECTION

Patent No. 4,468,971                    Dated September 4, 1984

Inventor(s) Peter J. Herzl and Robert J. Stevenson

It is certified that error appears in the above-identified patent and that said Letters Patent are hereby corrected as shown below:

Column 7, line 40:  insert --an-- between "at" and "angle"

Signed and Sealed this

Twenty-third Day of April 1985

[SEAL]

Attest:

DONALD J. QUIGG

Attesting Officer    Acting Commissioner of Patents and Trademarks